UNITED STATES PATENT OFFICE.

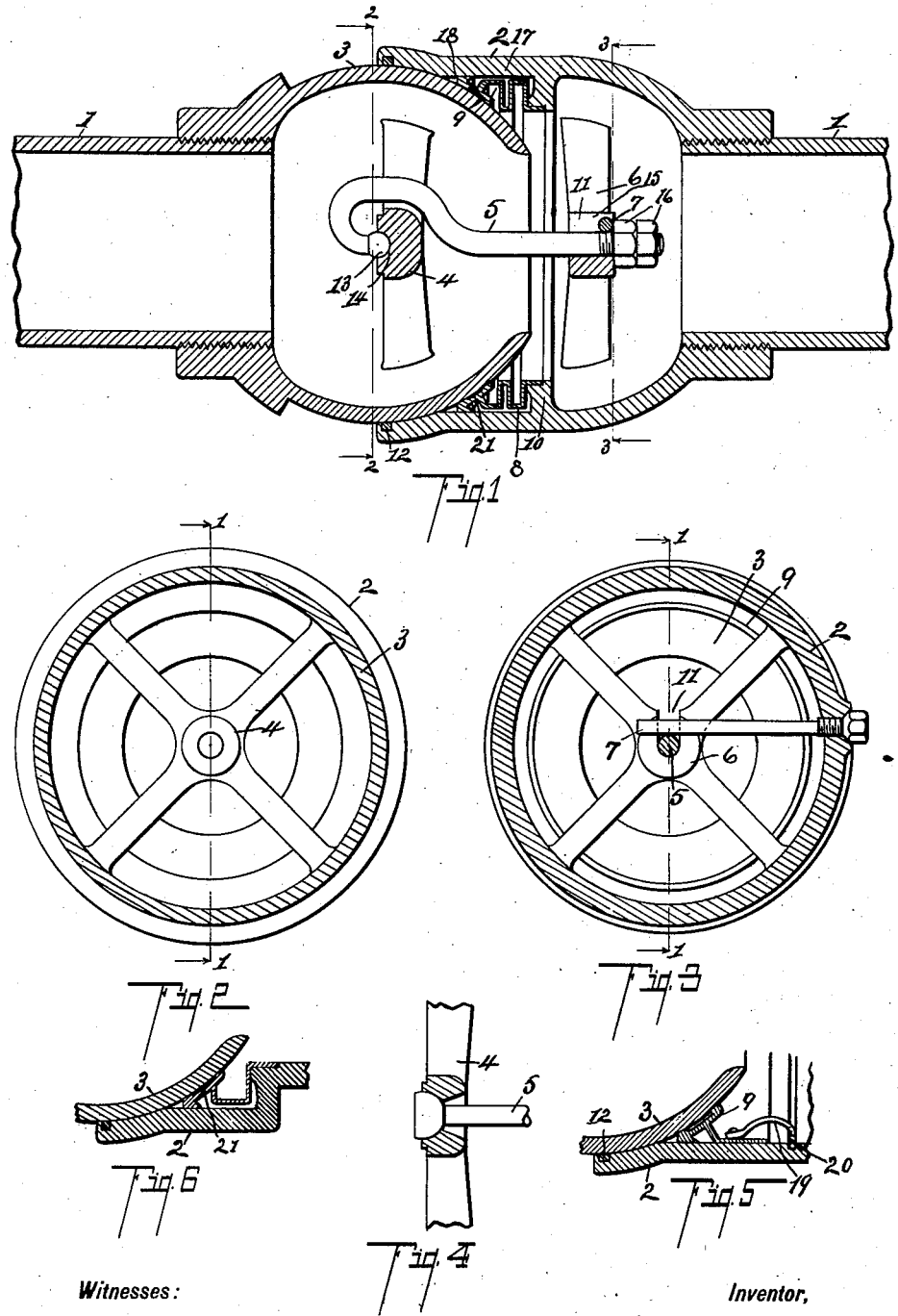

JOHN HENRY PHILLIPS, JR., OF JACKSON, MICHIGAN.

PIPE OR HOSE COUPLING.

No. 866,061.　　　　Specification of Letters Patent.　　　　Patented Sept. 17, 1907.

Application filed January 7, 1907. Serial No. 351,195.

*To all whom it may concern:*

Be it known that I, JOHN HENRY PHILLIPS, Jr., a citizen of the United States, residing in the city and county of Jackson, State of Michigan, have invented certain new and useful Improvements in Pipe or Hose Couplings, of which the following is a specification.

This invention relates to improvements in pipe or hose couplings.

The objects of this invention are,—first, to provide an improved ball-and-socket coupling for pipes or hose. Second, to provide an improved packing ring for hose or pipe couplings.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a detail longitudinal section of a structure embodying the features of my invention, taken on a line corresponding to lines 1—1 of Figs. 2 and 3. Fig. 2 is a cross section taken on a line corresponding to line 2—2 of Fig. 1. Fig. 3 is a cross section, taken on a line corresponding to line 3—3 of Fig. 1. Fig. 4 is a detail section of a modification of the coupling or connecting rod 5 for the coupling members. Fig. 5 is a detail section, showing a modified form of the packing ring. Fig. 6 is a detail section of a further modification of the packing ring.

In the drawing, the sectional views are taken looking in the direction of the little arrows at the ends of the section lines, and similar reference characters refer to similar parts throughout the several views.

Referring to the drawing, 1—1 represent the pipes to be coupled. On one of the pipes is a socket coupling member 2 adapted to receive the ball member 3. In the ball member is a spider-like cross-piece 4, and in the socket member is a similar cross-piece 6.

The ball member is retained in the socket by means of the coupling-rod 5, which is recurved or provided with a gooseneck at one end having a ball-like head arranged in a suitable seat 14, centrally located in the cross-piece 4. The cross-piece 6 is provided with a slot 15 adapted to receive the rod 5, the rod being threaded and provided with nuts 16, whereby it may be adjusted to bring the coupling members into proper relation. The coupling-rod 5 is preferably secured in the slot 6 by the pin 7, which is arranged transversely in the socket member, the same being preferably threaded through the wall thereof; see Fig. 3. By this arrangement, the coupling members may, if desired, be separated by merely removing the retaining pin 7. The coupling-rod 5 is centrally located so that the members readily turn on each other in any direction.

The packing ring 8 is formed of spring metal and is preferably U-shaped in cross section, one of the arms thereof being provided with a bearing ring 9 having ring-like bearing portions 17 and 18 at its edges, adapted to bear against the ball member. The bearing portion 18 is adapted to fit both the socket member and the ball member. The bearing portion 18 is preferably wedge-shaped in cross section and adapted to fit between the ball and socket members. The spring of the packing ring, owing to its U-shaped form and also owing to the pressure of the steam thereon, tends to force the bearing portion thereof against the socket member, forming a very perfect joint.

If desired, a gasket or metal packing ring 21 may be arranged in the groove between the bearing portions 17 and 18. The inner arm of the packing ring 8 is seated in a suitable annular shoulder 10 provided therefor.

In the modified construction shown in Fig. 5, the U-shaped feature of the packing ring is not present. The packing ring is preferably held in position in the socket member by spring fingers 19 which are adapted to engage the annular groove 20 in the socket member.

In the modified construction shown in Fig. 6, the U-shaped form is preserved, although modified. I preferably further provide the socket member with a packing ring 12 seated in a suitable groove provided therefor on its outer end. This packing ring is provided mainly as an excluder of dust and dirt, and is preferably formed of felt, or similarly fibrous material adapted to accomplish that end.

In the modified construction shown in Fig. 4, the coupling-rod 5 is arranged through the central portion of the spider, the rod being straight and the spider having a hole therethrough adapted to receive it. The form shown in Fig. 1 is preferred, however, as a more perfect bearing is secured therefor.

On account of the spring feature of the packing ring, it readily permits of the adjustment of the joint members in assembling, or to compensate for wear. Another advantage is that the packing ring adjusts itself to compensate for wear.

My improved coupling is very advantageous on account of the freedom of movement of the members, and further, the parts are simple and economical to produce and readily assembled.

While my improved packing ring is especially designed for use in a coupling of this character, the same is adapted to adjust itself to the coupling members so that accurate fitting is not required in manufacturing, and also, as stated, it readily adjusts itself to compensate for wear.

I have illustrated and described my improved pipe coupling in the form preferred by me on account of its structural simplicity and economy, although I am aware that it is capable of considerable variation in structural details without departing from my invention.

Having thus described my invention, what I claim as new and desire to secure by Letters Patent is:

1. In a pipe or hose coupling, the combination of a socket member; a ball member; cross-pieces for said members, one of said cross-pieces being provided with a central slot and the other with a central socket-like bearing; a coupling rod arranged in said slotted cross-piece having a gooseneck-like form at one end with a bearing ball thereon arranged in the bearing of the other cross-piece; a nut threaded upon said rod whereby it may be adjusted; and a pin for retaining said rod in said slot adapted to be adjusted from the outside, for the purpose specified.

2. In a pipe or hose coupling, the combination of a socket member; a ball member; cross-pieces for said members, one of said cross-pieces being provided with a central slot and the other with a central socket-like bearing; a coupling rod arranged in said slotted cross-piece having a gooseneck-like form at one end with a bearing ball thereon arranged in the bearing of the other cross-piece; and a pin for retaining said rod in said slot adapted to be adjusted from the outside, for the purpose specified.

3. In a pipe or hose coupling, the combination of a socket member; a ball member; cross-pieces for said members, one of said cross-pieces being provided with a central slot and the other with a central socket-like bearing; a coupling rod arranged in said slotted cross-piece having a bearing ball thereon arranged in the bearing of the other cross-piece; a nut threaded upon said rod whereby it may be adjusted; and a pin for retaining said rod in said slot adapted to be adjusted, from the outside, for the purpose specified.

4. In a pipe or hose coupling, the combination of a socket member; a ball member; cross-pieces for said members, one of said cross-pieces being provided with a central slot and the other with a central socket-like bearing; a coupling rod arranged in said slotted cross-piece having a bearing ball thereon arranged in the bearing of the other cross-piece; and a pin for retaining said rod in said slot adapted to be adjusted from the outside, for the purpose specified.

5. In a pipe or hose coupling, the combination of a socket member; a ball member; cross-pieces for said members, one of said cross-pieces being provided with a central slot and the other with a central socket-like bearing; a coupling rod arranged in said slotted cross-piece having a gooseneck-like form at one end with a bearing ball thereon arranged in the bearing of the other cross-piece; means for retaining said rod in said slot and a nut threaded upon said rod whereby it may be adjusted, for the purpose specified.

6. In a pipe or hose coupling, the combination of a socket member; a ball member; cross-pieces for said members, one of said cross-pieces being provided with a central slot and the other with a central socket-like bearing; a coupling rod arranged in said slotted cross-piece having a gooseneck-like form at one end with a bearing ball thereon arranged in the bearing of the other cross-piece and means for retaining said rod in said slot, for the purpose specified.

7. In a pipe or hose coupling, the combination of a socket member; a ball member; cross-pieces for said members, one of said cross-pieces being provided with a central slot and the other with a central socket-like bearing; a coupling rod arranged in said slotted cross-piece having a bearing ball thereon arranged in the bearing of the other cross-piece; means for retaining said rod in said slot and a nut threaded upon said rod whereby it may be adjusted, for the purpose specified.

8. In a pipe or hose coupling, the combination of a socket member; a ball member; cross-pieces for said members, one of said cross-pieces being provided with a central slot and the other with a central socket-like bearing; a coupling rod arranged in said slotted cross-piece having a bearing ball thereon arranged in the bearing of the other cross piece and means for retaining said rod in said slot, for the purpose specified.

9. In a pipe or hose coupling, the combination of a socket member; a ball member; cross-pieces in said members; a coupling for said cross-pieces; means for adjusting said rod; and means for securing said rod in position, adapted to be adjusted from without said coupling members.

10. In a pipe or hose coupling, the combination of a socket member; a ball member; means for adjustably securing said members together; and a packing ring formed of spring metal U-shaped in cross-section, fitted into said socket member, said packing ring having a bearing ring on its inner arm with ring-like bearing portions at each edge, one of said bearing portions being wedge-shaped in cross-section and adapted to fit between said socket and ball members.

11. In a pipe or hose coupling, the combination of a socket member; a ball member; and a packing ring formed of spring metal U-shaped in cross-section, fitted into said socket member, said packing ring having a bearing on its inner arm with ring-like bearing portions at each edge, one of said bearing portions being wedge-shaped in cross-section and adapted to fit between said socket and ball members.

12. In a pipe or hose coupling, the combination of a socket member; a ball member; means for adjustably securing said members together; and a packing ring formed of spring metal having a bearing ring provided with ring-like bearing portions at each edge, one of said bearing portions being wedge-shaped in cross section and adapted to fit between said socket and ball members.

13. In a pipe or hose coupling, the combination of a socket member; a ball member; and a packing ring formed of spring metal having a bearing ring provided with ring-like bearing portions at each edge, one of said bearing portions being wedge-shaped in cross section and adapted to fit between said socket and ball members.

In witness whereof, I have hereunto set my hand and seal in the presence of two witnesses.

JOHN HENRY PHILLIPS, JR. [L. S.]

Witnesses:
  W. A. CUNNINGHAM,
  F. A. PALMER.